United States Patent [19]
Nelson

[11] 4,204,278
[45] May 20, 1980

[54] METHODS AND APPARATUS FOR THE GENERATION AND TRANSMISSION OF SIGNALS FOR ECHO LOCATION AND OTHER SIGNALLING PURPOSES, AS IN GEOPHYSICAL EXPLORATION

[75] Inventor: David E. Nelson, Rochester, N.Y.
[73] Assignee: Hydroacoustics Inc., Rochester, N.Y.
[21] Appl. No.: 921,405
[22] Filed: Jul. 3, 1978
[51] Int. Cl.² .............................................. G01V 1/22
[52] U.S. Cl. ...................................... 367/39; 367/41; 367/49; 367/137; 181/119; 343/17.2 PC
[58] Field of Search ....................... 181/119, 120, 114; 340/15.5 TA, 5 R, 17 R, 3 R; 343/17.2 PC

[56] References Cited
U.S. PATENT DOCUMENTS

| | | | |
|---|---|---|---|
| 3,618,095 | 11/1971 | Darlington | 343/17.2 PC |
| 3,757,331 | 9/1973 | Moulton | 343/17.2 PC |
| 3,905,033 | 9/1975 | Moore et al. | 343/17.2 PC |
| 4,004,267 | 1/1977 | Mayne | 340/15.5 TA |
| 4,069,470 | 1/1978 | Cunningham et al. | 340/15.5 TA |
| 4,147,228 | 4/1979 | Bouyoucos | 340/15.5 TA |
| 4,156,875 | 5/1979 | Debuisser | 343/17.2 PC |

Primary Examiner—Howard A. Birmiel
Attorney, Agent, or Firm—Martin LuKacher

[57] ABSTRACT

Quasi periodic pulse trains are generated and swept in repetition frequency over an octave. Spectral harmonics of the pulse trains which prevent the trains from having a constant or "flat" power spectrum over a frequency range much greater than an octave are reduced or eliminated by adjusting the shape of the pulses in the trains. By means of selecting the timing of the pulses, other harmonics are reduced or preferentially augmented. The spectral energy of the signals which are generated during a transmission interval is of the type which possesses an autocorrelation function with a narrow main lobe and low side lobe levels which is especially suitable for echo location purposes such as in geophysical exploration in which seismograms are constructed by cross correlation of the signals which are transmitted with those which are received from the geological reflection surfaces.

32 Claims, 11 Drawing Figures

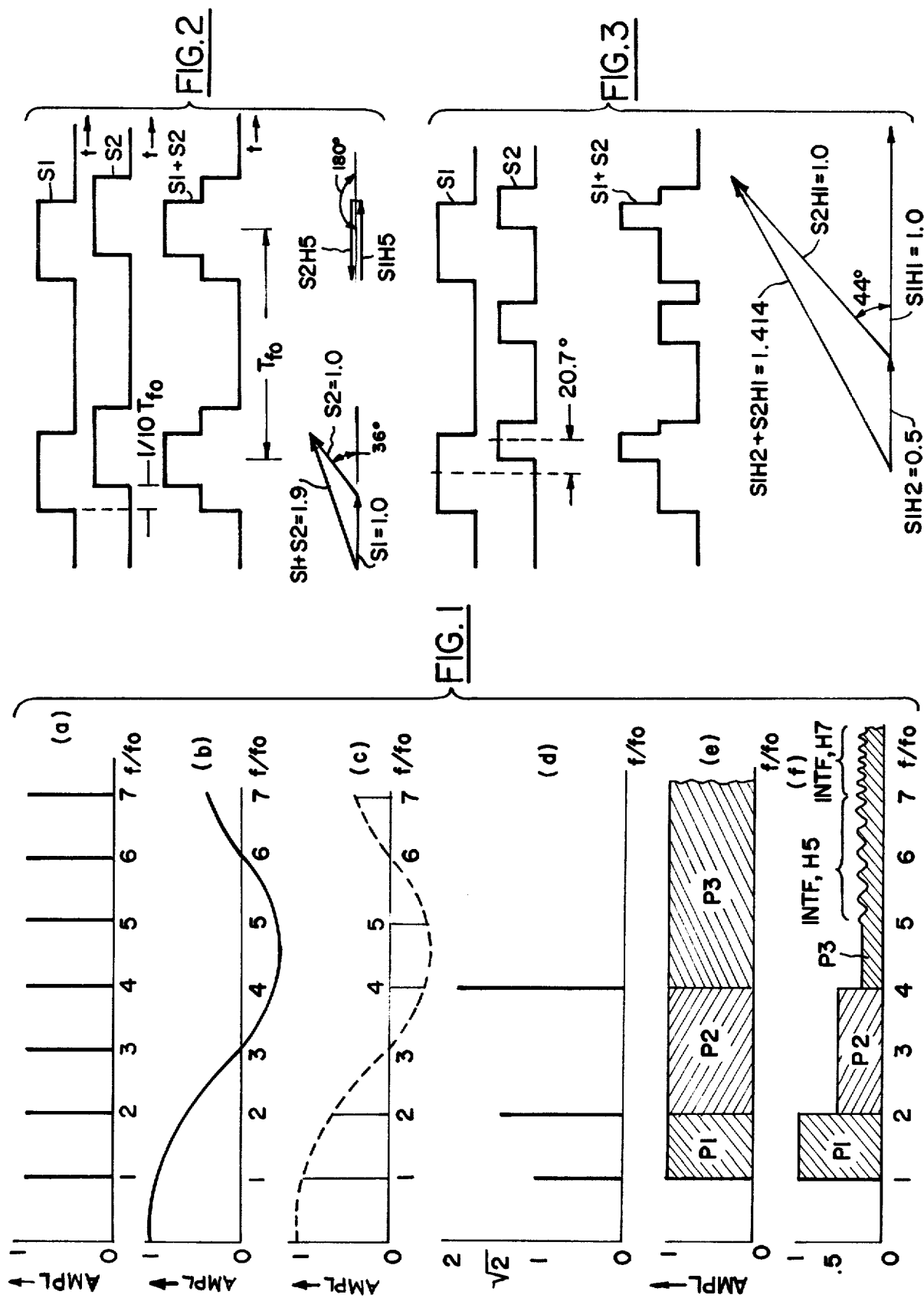

METHODS AND APPARATUS FOR THE GENERATION AND TRANSMISSION OF SIGNALS FOR ECHO LOCATION AND OTHER SIGNALLING PURPOSES, AS IN GEOPHYSICAL EXPLORATION

The present invention relates to methods of and apparatus for generating and transmitting signals in accordance with a predetermined format or code such that the sequence exhibits a relatively smooth power spectrum extending over a broad frequency band useful for echo location and other signalling purposes.

The invention is especially adapted to and suitable for generation of seismic signals for use in geophysical exploration and enables such signals to be transmitted, in the form of rectangular waves with high energy, efficiently into a transmission medium, either in marine environments or on land.

The present invention is related to the invention of John V. Bouyoucos in methods and apparatus of transmitting bi-level and N-level signals, which are especially suitable for seismic exploration. This related invention is described in a patent application filed concurrently herewith and assigned to the same assignee as this application, Ser. No. 921,399, filed July 3, 1978.

In application, Ser. No. 828,698 filed Aug. 29, 1977 in the name of David E. Nelson, methods and apparatus are disclosed for obtaining a transmission having an autocorrelation function with low side lobe levels using sequences of narrow pulses properly timed with respect to each other and with the amplitude of the pulses in certain relationship. The shape of the individual pulses controlled only the maximum frequency present in the spectrum. The timing of the pulses resulted in a line spectrum in which only octave harmonics of the repetition frequency of the pulse trains were present. An octave harmonic is one whose frequency is $2^n$ times the frequency of the fundamental repetition frequency, where n is an integer. The timing of the pulses in the trains resulted in the reduction or elimination of the non-octave harmonics. Additionally, the normalized amplitude of the octave harmonic was the square root of n where n is the harmonic number thereof.

The methods and apparatus provided by this invention also produce an octave harmonic spectrum wherein the non-octave harmonics are reduced or eliminated over a frequency range of more than an octave. In accordance with this invention, the shape of the signal is adjusted to reduce or eliminate many of the non-octave harmonics. In a preferred embodiment, signals having at least two levels, such as rectangular or square waves, are used. The portion of the wave having a one of the two levels is referred to herein as a pulse. The duration of the pulse is selected so that certain non-harmonic octaves of the spectrum are reduced or eliminated. Specifically, where the pulse duration is one-third the period of the repetition frequency of the pulse train, non-octave harmonics having harmonic numbers 3n, where n is an integer, are eliminated. By selecting time displacement of pulses in a plurality of pulse trains, other non-octave harmonic components of the spectrum may be eliminated and octave harmonic components augmented in amplitude. The repetition frequencies of these pulse trains are swept over one octave. A substantially flat power spectrum results, viz., a spectrum with substantially constant spectral energy extending smoothly over a range exceeding the fundamental octave of the sweep. This spectrum provides the autocorrelation function desired for use in seismic exploration and other echo location and signalling systems.

Accordingly, it is an object of the present invention to provide improved methods of and apparatus for generating and transmitting signals for echo location, such as in seismic exploration, and for other signalling purposes.

It is another object of the invention to provide methods of and apparatus for producing repetitive signals whose spectral line amplitudes have desired amplitude relationships.

It is a still further object of the present invention to provide methods and apparatus for generating and transmitting signals having a substantially flat power spectrum through the use of rectangular wave forms, such as have at least two levels and may be pulses, which may be efficiently generated with high power.

Briefly described, a method of transmitting signals having a spectrum extending over a frequency range of more than an octave in accordance with this invention first generates repeatedly at least one signal having a wave form with at least two levels which divide the duration of the signal in proportion to the order of the spectral harmonic which is to be minimized. Then the signal is swept over an octave frequency range by changing its duration as it is repeated during a transmission interval by a factor of 2 to 1. Several signals having similar waveforms may be generated and time displaced with respect to each other, with the time displacement remaining the same proportion of the duration or period of each repetition, so as to reduce the amplitude of some and augment the amplitude of other spectral harmonics. The resulting transmission has spectral energy at a substantially constant level over a frequency range containing several octaves notwithstanding that the repetition frequency of each pulse train sweeps over a range not exceeding one octave.

The foregoing and other objects and advantages of the invention as well as the mode of operation and presently preferred embodiments thereof will become more apparent from a reading of the following description in connection with the accompanying drawings in which:

FIG. 1 is several diagrams illustrating the spectrum of pulse signals having different characteristics;

FIG. 2 are waveform and vector diagrams of the signals resulting from two pulse trains which are generated and transmitted in accordance with the invention;

FIG. 3 are waveform and vector diagrams of a fundamental and second harmonic pulse trains generated in accordance with the invention;

Figure 4:
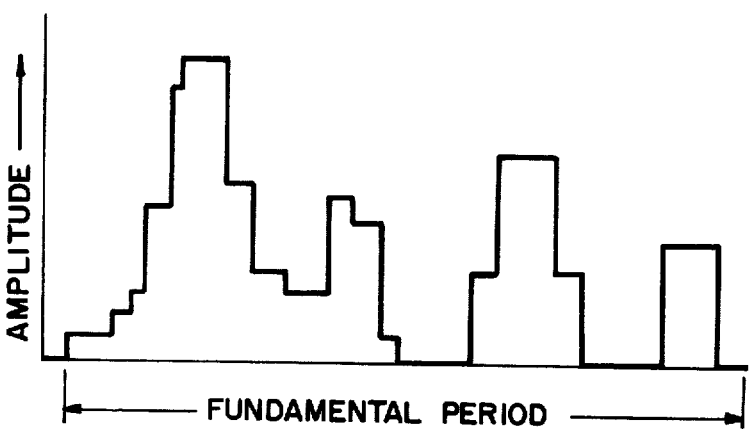
FIG. 4 is a wave form of a composite signal resulting from the summation of several pulse trains which are generated in accordance with the invention.

Referring first to FIG. 1, it will be seen that a signal element consisting of two levels, such as a rectangular pulse waveform may be shaped to eliminate or reduce the amplitude of an undesired line of its energy spectrum, and thus form a signal element or building block of a repetitive signal having a shaped spectrum.

In FIG. 1(a) there is illustrated the spectrum which results from a periodic repetition of a pulse with a very short duration in relation to the period of its repetition frequency. In the limit the pulse is an "impulse" or Dirac delta function (viz., the duration of the pulse approaches zero while the pulse area is held constant). The line spectrum associated with a train of such pulses consists of a series of equal amplitude, equally spaced spectral lines having a spacing equal to the repetition frequency, as shown in FIG. 1(a).

FIG. 1(b) illustrates the spectrum of a rectangular pulse waveform with a pulse width or duration one-third of the period of the pulse train of FIG. 1(a). In other words, the waveform of this pulse has at least two levels which divide the duration thereof in a proportion of 1 to 2. From Fourier transform theory, it is known that the spectrum of such a pulse is defined by the function Sin X/X where X is $\omega T_o/2$, where $\omega$ is the angular frequency of the spectral component of the pulse waveform and $T_o$ is the pulse duration. Such a pulse displays spectral nulls where X takes on values of $\pi$, $2\pi$, $3\pi$, etc. These nulls correspond to frequencies whose periods equal the pulse width or which subdivide the pulse width into equal parts. Such frequencies are shown in the spectrum of FIG. 1(b) as being 3 times and 6 times a frequency whose period is the pulse period.

FIG. 1(c) illustrates the spectrum obtained for a pulse train made up of repetitions of pulses whose widths or durations are one-third the period of the repetition frequency. The spectral nulls correspond with the nulls of the single pulse shown in FIG. 1(b). The spectral lines at harmonic numbers 3n, where n is an integer, are eliminated. These are the third and sixth harmonics as shown in FIG. 1(c). Amplitudes of the other harmonics are altered and follow the amplitude envelope of the spectrum of the individual pulse as shown in FIG. 1(b).

A spectrum containing only the octave harmonics in proper proportion for creating a flat power spectrum is illustrated in FIG. 1(d). Such a spectrum was discussed in the above referenced application of David E. Nelson. When the repetition frequency of the signals making up the spectrum is swept monotonically at a constant rate over an octave, all frequencies in the power spectrum are generated with equal amplitude and the autocorrelation function has a narrow main lobe and very low side lobe level.

FIG. 1(e) illustrates the ideal spectrum obtained by sweeping the octave harmonic spectrum of FIG. 1(d) over an octave of the fundamental repetition frequency. The spectrum level of the second harmonic panel P2 is of the same amplitude as the first harmonic panel P1. This amplitude relationship is true for all higher harmonic panels, such as panel P3. Since the harmonic line amplitude is augmented by the square root of n, where n is the harmonic number, as shown in FIG. 1(d), the power is increased to offset the spectral loss due to the increasing sweep rate. This is because the sweep rate for each harmonic is directly proportional to the harmonic number, which reduces the spectral power level in accordance with the square of that number.

FIG. 1(f) illustrates the spectrum obtained by changing the duration or period of the pulses whose spectrum is shown in FIG. 1(c) so that the train of these pulses sweeps monotonically at a constant rate over an octave. Inasmuch as the 3n (third and sixth) harmonics are eliminated, the panels P1, P2 and P3 are flat over a range equal to five times the lowest frequency of the lowest octave. However, the harmonic panels are not equal in amplitude, reflecting that the octave harmonics of the pulse train do not have the amplitude value equal to the square root of n. Moreover the fifth harmonic and the seventh harmonic are present causing the spectrum to undulate, beginning at the fifth harmonic and changing again at the seventh harmonic. By utilizing the steps illustrated in FIGS. 2 and 3, the substantially flat spectrum can be obtained.

FIG. 2 shows two pulse trains S1 and S2 which are displaced in time but otherwise identical. The displacement is one-tenth the fundamental repetition period (1/10 $T_{fo}$) or 36°. The sum of these trains is shown as a composite signal S1+S2. The two pulse trains, because of their displacement in time, cause the fifth harmonic to cancel. The time displacement is the product of 1/5, 180°/360° and $T_{fo}$. In other words the displacement is one-tenth of the fundamental period. The vector diagrams show the relationship between the fundamental components of the S1 and S2 pulse trains and further show that the fifth harmonic components S1H5 and S2H5 cancel, since they are 180° out of phase.

By a similar method, using a time displacement of one-fourteenth the fundamental repetition period the seventh harmonic components can be made to cancel.

FIG. 3 shows the use of a fundamental and a second harmonic pulse train both of one-third duration and at a specific time displacement to augment the magnitude of the second harmonic of the sum signal to the value (the square root of 2 or 1.414) required to obtain the flat octave harmonic spectrum through the second harmonic panel. The pulse train S1 operates at the fundamental repetition frequency and the pulse train S2 at the second harmonic of this repetition frequency. The sum or composite signal S1+S2 results from these trains. Both trains are swept slowly, the first (S1) over the fundamental octave and the second (S2) over the octave of the second harmonic of S1. The pulse trains are displaced in time 20.7° referenced to the fundamental period. As shown in the vector diagram in FIG. 3, this corresponds to a phase displacement of 41.4° at the second harmonic of the fundamental repetition frequency. The fundamental component of each pulse train has the normalized value of 1.0; the amplitudes of the pulses being equal. The second harmonic component of the fundamental pulse train S1H2 has a normalized amplitude of 0.5. The sum of the second harmonic component of the fundamental pulse train, S1H2, and the fundamental component of the second harmonic train, S2H1, is the square root of 2, as shown in the vector diagram in FIG. 3. A similar method can be used to augment the fourth harmonic component and to establish for this fourth harmonic a level of 2.

FIG. 4 shows the time waveform for one period of a transmission made up of pulse trains S1 to S6 listed in Table I below. An octave harmonic spectrum is generated by these pulse trains when the repetition frequency is monotonically swept in frequency over one octave of the fundamental repetition frequency. This power spectrum is flat over a frequency range of 8 to 1 beginning at the lowest repetition frequency.

Table I

Amplitudes and Phases of the Six Pulse Trains Used to Generate an Octave Harmonic Spectrum over an 8:1 Frequency Range

| SIGNAL NO. | OCTAVE RANGE | NORMALIZED AMPLITUDE | PHASE* |
|---|---|---|---|
| 1 | Fundamental | ⅓ | 0 |
| 2 | Fundamental | ⅓ | 25.7143 |
| 3 | Fundamental | ⅓ | 36 |
| 4 | Fundamental | ⅓ | 61.7143 |
| 5 | Second Harmonic | 1 | 42.6516 |
| 6 | Fourth Harmonic | 1.315 | 57.6516 |

*Start point of first pulse in the period relative to the start of the period.

In generating the six pulse trains the following steps are followed:

1. The fundamental pulse train S1 is chosen for the lowest octave in the frequency range. The pulse width or duration is one-third of the fundamental period. All of the other signals have the same one-third period duration and the third and sixth harmonic spectral lines are nulled.

2. Three more fundamental pulse trains S2, S3 and S4 are generated. These trains are grouped in pairs (S1 and S2 constituting a first pair and S3 and S4 constituting a second pair). The signals S1 and S2 are displaced in time and the signals S3 and S4 are similarly displaced in time (by 25.7143°) so as to null the seventh harmonic, as was explained in connection with FIG. 2. The two pairs are then displaced with respect to each other by 36° to null the fifth harmonic, again as was explained in connection with FIG. 2.

3. The fifth pulse train S5, at the second harmonic of the fundamental repetition frequency, augments the second harmonic to the proper amplitude (the square root of 2) as was explained in connection with FIG. 3.

4. A sixth pulse train S6 at the fourth harmonic augments the fourth harmonic to the proper value (the square root of four or 2) as was explained also in connection with FIG. 3.

Figure 5:
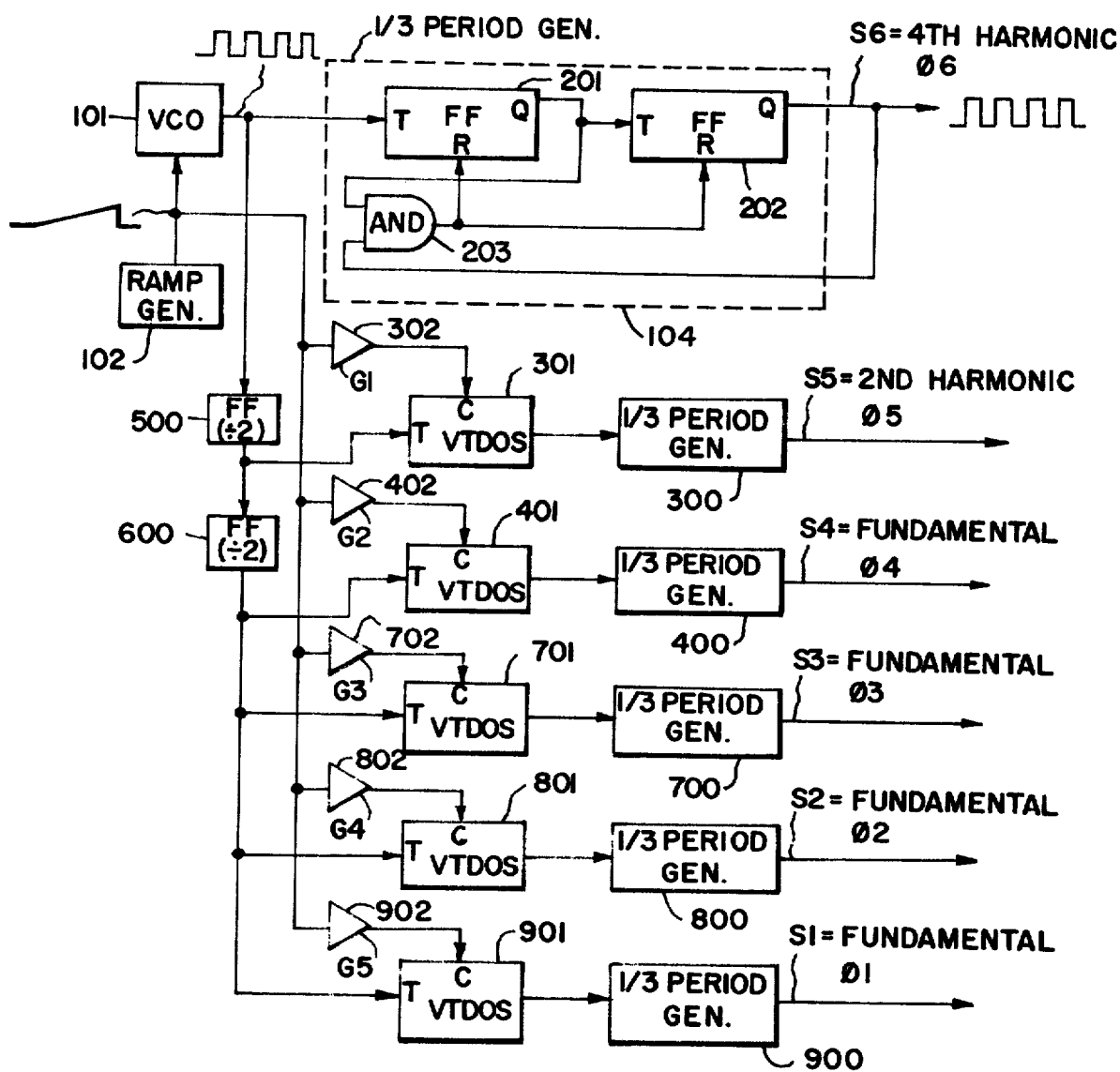
FIG. 5 is a block diagram of a system for generating pulse trains in accordance with the invention.

A system for generating the six pulse trains S1 to S6 is illustrated in FIG. 5. The repetition frequency is determined by a voltage controlled oscillator 101. The pulse trains are then coherent with each other. This frequency is swept over an octave by a ramp generated by a ramp generator 102. The duration of this ramp is equal to the duration of the transmission. The amplitude of the ramp is adjusted so that the frequency of the VCO 101 sweeps a ratio of 2 to 1, or one octave. The output of the VCO 101 is a pulse signal which triggers a one-third period generator 104. This generator is made up of two flip-flops 201 and 202, which constitute a binary divider which counts to 2 and returns, since it is reset by an AND gate 203. The signal from the Q output of flip-flop 202 is the S6 pulse train at the fourth harmonic. The pulses have a period of one-third the repetition period of the pulses provided by the VCO 101.

Another flip-flop 500 divides the VCO frequency by 2. Another flip-flop 600 which is connected to the output of the flip-flop 500 further divides the VCO frequency by 2 or a total of 4 to 1. The second harmonic pulse train of one-third duration pulses is generated by a one-third period generator 300 and a variable time delay one-shot 301. The output of the ramp generator 102 is amplified in an amplifier 302 having the gain necessary to set the time displacement, in terms of the duration of the output pulse from the variable time delay one-shot 301 so that it is the same proportion of a period in each repetition or period of the pulses in the S5 train. In other words the S5 train will only be 42.6516° displaced from the S1 train over the entire sweep (see Table I). The four signals S1 to S4 at the fundamental repetition frequencies are generated in response to the pulses from the flip-flop 600 by one-third period generators 400, 700, 800 and 900. The time displacements of these fundamental signals are obtained by variable time delay one-shots 401, 701, 801, and 901. Amplifiers 402, 702, 802 and 902 each having different gains G1 to G5 control the time displacements so that they are in the same proportion of a period in each repetition or period of the signals S1 to S4 occurring during the transmission. Again, these time displacements correspond to the phase shifts shown in Table I.

Figure 6:
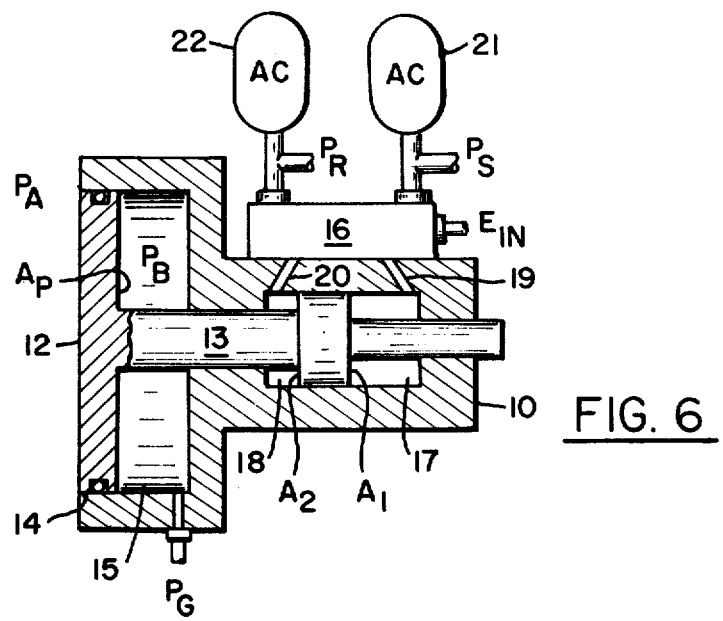
FIG. 6 is a sectional view diagrammatically illustrating a seismic source which is controlled by signals generated in accordance with the invention for transmitting seismic signals corresponding thereto.

Six seismic sources such as illustrated in FIG. 6 may be used to transmit seismic signals corresponding to the signals S1 to S6. The source shown in FIG. 6 is the subject matter of the above-referenced application filed concurrently herewith in the name of John V. Bouyoucos.

Each source consists of a housing 10 in which a coupling piston 12 is reciprocally mounted. The piston forms an interface with the medium into which the seismic signals are to be injected which in the illustrative case is water in a marine environment. A cavity 15 behind the piston 12 is filled with pressurized gas such as air from a source indicated as $P_G$ to a pressure $P_B$ at least equal to the pressure $P_A$ exerted on the piston 12 by the surrounding medium. A drive piston 24 is connected by a shaft 13 to the coupling piston 12. This piston presents two drive areas $A_1$ and $A_2$ to cavities 17 and 18 in the housing 10. These cavities are supplied with pressurized hydraulic fluid through passages 19 and 20. The fluid is switched between supply and return pressures $P_S$ and $P_R$ from a hydraulic power supply by means of a four-way electro-hydraulic valve 16. The signals are applied as the input control signal $E_{IN}$ to the valve 16. Accumulators 21 and 22 are closely coupled to the valve so as to minimize fluctuation in the pressures $P_S$ and $P_R$. When the pulse signal is positive, hydraulic fluid in the cavity 17 is switched from return to supply pressure while the fluid in the cavity 18 is switched to return pressure. A positive force is then applied to the piston 12 for the duration of the signal. This force is transmitted as a compressive force into the medium. When the other level (for two-thirds of the duration of the signal) is present supply pressure is switched by the valve to the cavity 18 and return pressure is switched to the cavity 17. A tensile or negative force is then applied to the medium. Since the hydraulic fluid is switched between supply and return pressures a pulse train with a bi-level waveform is transmitted into the medium. This pulse train is transmitted with high efficiency, since the pressures are switched and losses due to throttling of fluid in the ports of the valve are minimized. The sources of the type shown in FIG. 6 may have different drive areas so as to obtain the relationship of signal amplitudes shown in Table I.

Figure 7:
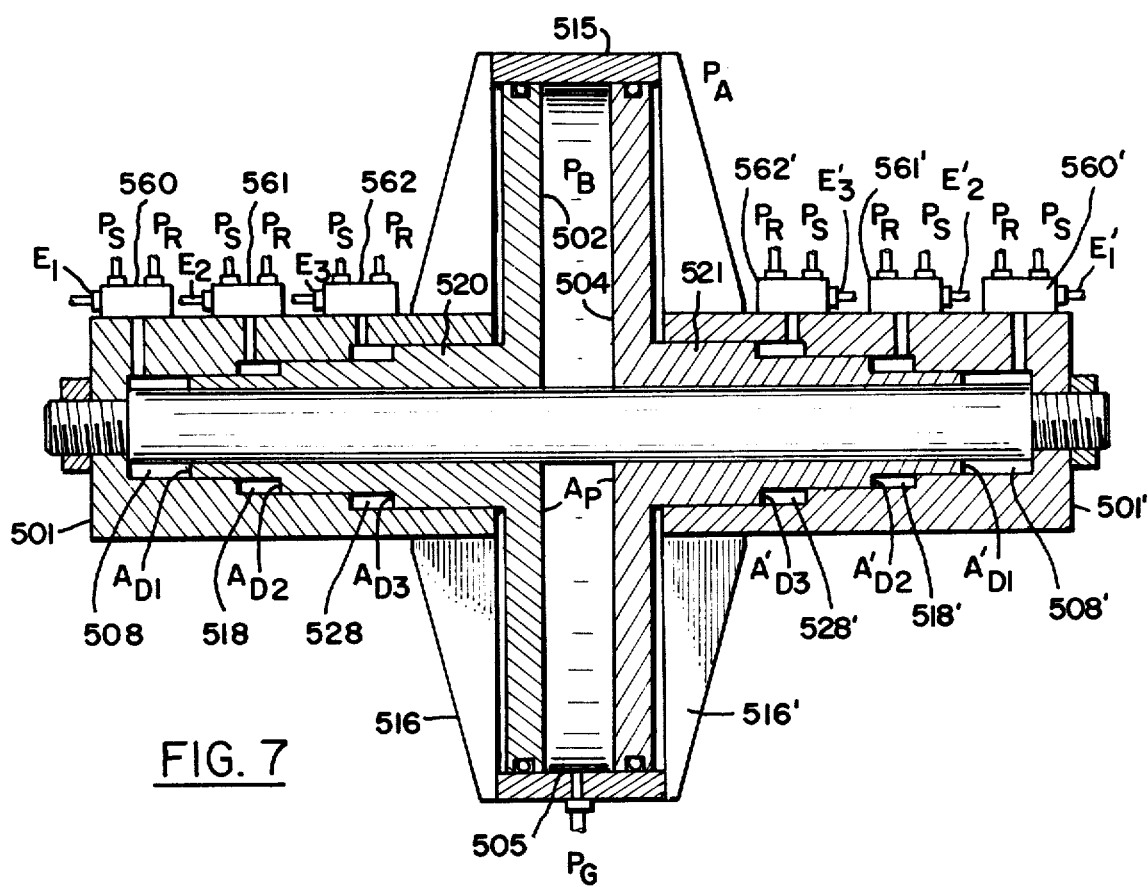
FIG. 7 is a section view of another seismic source which may be used for transmitting signals generated by the system illustrated in FIG. 5.

A N-level force generator as illustrated in FIG. 7 may be used to transmit the composite signal by summing all of the individual signals S1 to S6. The composite signal is a signal of the waveform shown in FIG. 4. The source shown in FIG. 7 is the subject matter also of the above-referenced concurrently filed application of John V. Bouyoucos. In the source two pistons 502 and 504 are mounted by coaxial extensions 520 and 521 so as to slide on a shaft 503. The pistons are in back-to-back relationship and define a cavity 505 in a cylinder 515 in which they are also slidable along their outer peripheries which are sealed by means of "O" rings. The cavity 505 is pressurized from a source of pressurized gas indicated at $P_G$ to a pressure $P_B$ which is higher than the pressure $P_A$ of the surrounding medium (water in the marine environment). Housings 501 and 501' are symmetrically disposed with respect to the pistons 502 and 504 and are attached at the ends of the shaft 503. Struts 516 and 516' connect the outer cylinder 515 to the housings 501 and 501' so that the housings and cylinder are fixed while the pistons 502 and 504 move toward and away from each other. The coaxial extensions 520 and 521 of the pistons and the inner periphery of bores in the housing 501 and 501' are formed with steps to define cavities 508, 508', 518, 518', and 528, 528'. The steps on the coaxial extensions form drive areas $A_{D1}$, $A_{D2}$, $A_{D3}$, $A_{D1}'$, $A_{D2}'$, and $A_{D3}'$. These six drive areas may all be different. By increasing the drive areas or decreasing them the amplitude of the signal may be adjusted. In this manner amplitude control as is required for the signals shown in Table I is obtained. Separate pairs of three-way electro-hydraulic valves 560, 560', 561, 561' and 562, 562' are in communication with the cavities 508, 508', 518, 518' and 528, 528'. The signals are applied to the valves and the pressures in the cavity are switched between supply and return pressures, generating forces of duration corresponding to durations of the pulses in each repetition period to the pistons 502 and 504. The forces sum and the composite signal is generated by the pistons 502 and 504. The number of levels, N, which can be produced by an N-level source, is $2^V$, where V is the number of valves. The number of valves, V, may be chosen equal to the number of signals, in which case a single source can provide the exact octave harmonic spectrum developed by this number of signals. For instance, the waveform of FIG. 4 requires 6 signals, which could be produced by a source with 6 cavities and will provide a flat, undulation-free spectrum through the eighth harmonic.

It may be possible to approximate the octave harmonic spectrum by omitting the fifth and seventh harmonic cancellations. In this case, signals S1 through S4 Table I, are combined into a single signal of amplitude 1 and common phase 39.7143 (22° displaced from the second harmonic source, S5, as shown in FIG. 3). In this case, 3 cavities and 8 levels are required for the approximate signal, which will be flat, but with some undulation, through the eighth harmonic.

If a spectrum flat through only the second harmonic panel is desired, the higher frequency source, S8, may be deleted entirely, leaving only 2 signals. In this case, a two cavity source will suffice.

Figure 10:
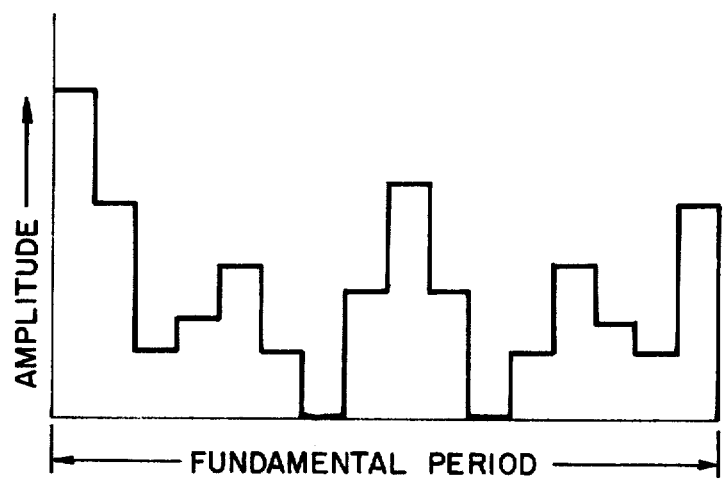
FIG. 10 is a waveform diagram of the fundamental period of a composite signal which may be generated in accordance with the invention.

When each drive area is used individually to produce a desired signal, the reaction forces on the housing 501, 501' are not necessarily balanced, and the housing may be subjected to dynamic accelerations requiring care in its mounting. Alternatively, the opposing pistons 502, 504 may be driven in a balanced mode where pairs of areas on opposing sides are matched, and the corresponding valves are driven in synchronism. In this case, reaction forces on the housing are minimized or eliminated. In order to achieve such balanced drive, the number of independent signals that can be transmitted is halved. This is achieved in the 3 cavity, 8 level case considered above when applied to FIG. 7 where six cavities would be used to produce 3 independent signals in a balanced position. The waveform of FIG. 10 then results.

In the configurations just discussed the cavity sizes are chosen to provide a specific force level, each exactly and independently defining a two-level signal. The source is actually several sources compressed into one, wherein each cavity provides one of the signals.

Figure 11:
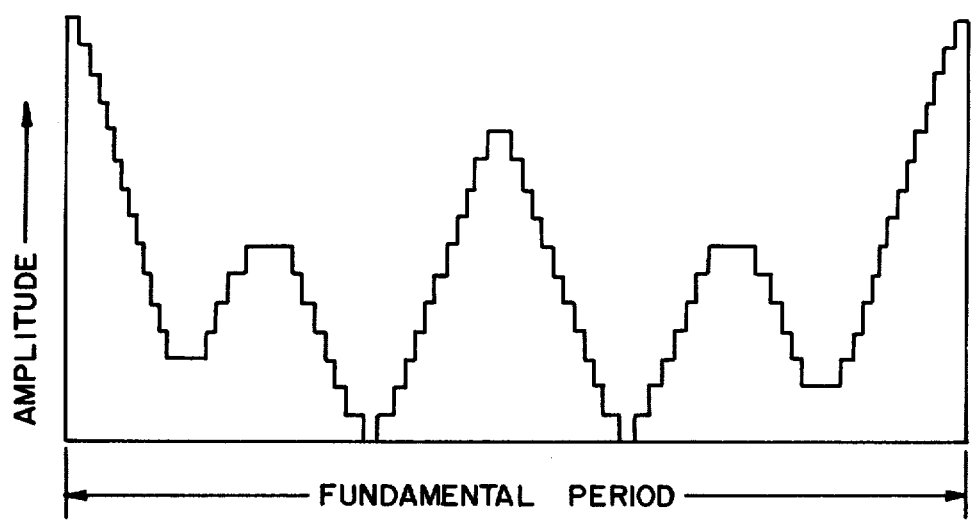
FIG. 11 is a waveform diagram similar to FIG. 10 which is quantized into 16 levels.

There is still another approach to using the N-level source. The N-levels may be redefined into equal quantum steps and each level defined by a binary code. Then, each of the levels of FIG. 4 or 8 may be replaced by the nearest quantum step, and the cavities pressurized in accordance with the binary code associated with each of the levels. This additional approximation—that of replacing an exact level with the nearest quantum step—causes a further degradation of the octave harmonic spectrum. However, it has been found that if four cavities, with 16 quantum steps, are employed, the waveform of FIG. 11 can be produced, and provides a flat, undulation-free spectrum through the eighth harmonic. Such a source is less specialized, since the cavity sizes progress in exact powers of two, and could be used to transmit any waveform within the limits of sampling rate (i.e., valve switching speed) and quantizing accuracy.

In the event that the waveform of the two-level pulse is distorted the spectral nulls may be shifted with the result that the desired spectrum of the transmission is not obtained. Such distortion may be compensated by adjusting the width of the pulse.

Figure 9:
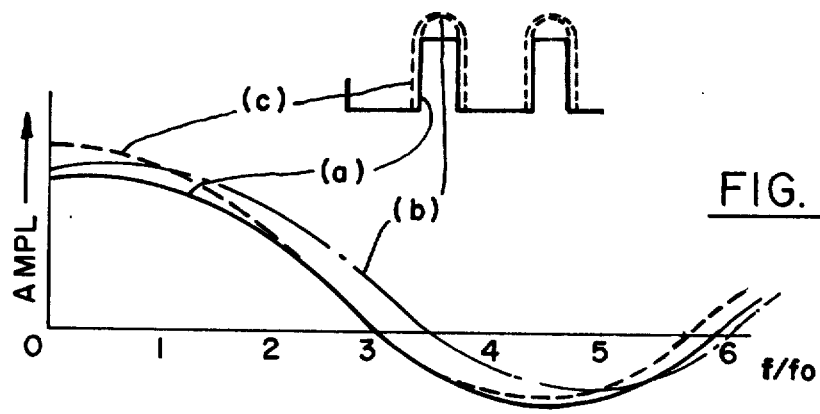
FIG. 9 is a plot of the spectrum of one of the pulse trains showing the operation of the system of FIG. 8 in compensating for distortion.

The effect of the distortion is illustrated in FIG. 9. The undistorted waveform and the spectrum corresponding thereto are designated by (a). Distortion as exemplified by a half cosine pulse added to the undistorted pulse and the shift in the spectral null away from the third harmonic is shown by the lines made up of long and short dashes and designated by (b). The adjusted pulse of increase width and the resulting spectrum which again has a null at the third harmonic is shown by the lines made up of short dashes and designated by (c).

Figure 8:
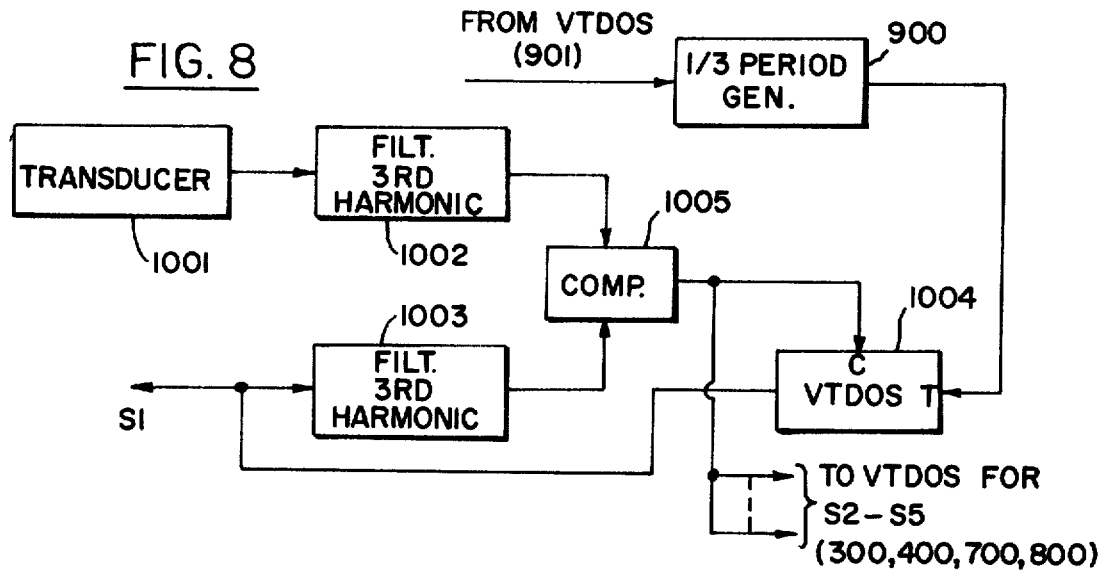
FIG. 8 is a block diagram of a system for controlling the duration of the pulses so as to compensate for distortion.

In order to vary the duration of the pulse the signal generating system of FIG. 5 may be modified as shown in FIG. 8. A transducer 1001 in the medium (either in the water or ground near the source or sources of the signals) detects the signals. The third harmonic is selected from the transducer signals by a filter 1002. The third harmonic of the S1 signal from the ⅛ period generator 900 is also selected by another filter 1003 after these $S_1$ signals are processed in a variable time delay one-shot (VTDOS) 1004. The width of the pulse from the ⅛ period generator 900 is varied in the VTDOS 1004 in response to the difference in amplitude of the third harmonic components in the medium and in the $S_1$ signal by a comparator 1005 which may be a differential amplifier. The third harmonic is nulled by controlling the pulse width of the $S_1$ signal in response to the error signal from the comparator 1005. This error signal is applied to other VTDOS'S, one for each of the $S_2$ to $S_5$ signals which similarly adjusts their duration.

From the foregoing description it will be apparent that there has been provided improved methods and apparatus for the generation and transmission of signals having spectra which are substantially flat over a broad frequency range. Variations and modifications of the herein-described methods and apparatus within the scope of the invention will undoubtedly suggest themselves to those skilled in the art. Accordingly, the foregoing description should be taken as illustrative and not in a limiting sense.

What is claimed is:

1. The method of transmitting signals having a spectrum extending over a frequency range of more than an octave with the energy due to certain spectral harmonics minimized, which comprises the steps of generating repeatedly at least one signal having a waveform with at least two levels which divide the duration of the signal in proportion to the order of the spectral harmonics which are to be minimized, and changing the duration of said signal as it is repeated during said transmission with the ratio of the duration of the longest to the shortest signal not exceeding a factor of 2 to 1 such that the repetition frequency of said signal sweeps over an octave.

2. The invention as set forth in claim 1 wherein said proportion is 1 to 2 and spectral harmonics have harmonic numbers 3n, where n is an integer, are minimized.

3. The invention as set forth in claim 1 where said signal consists of pulses.

4. The invention as set forth in claim 1 wherein said signals are seismic signals transmitted into a medium, said levels corresponding to forces applied to said medium, said generating step being carried out such that the level of shorter duration corresponds to a compressive force on said medium and said level of longer duration corresponds to a tensile force on said medium.

5. The invention as set forth in claim 4 wherein said generating step is carried out such that the ratio of said shorter duration to said longer duration is 1:2 and spectral harmonics having harmonic numbers 3n, where n is an integer, are minimized.

6. The invention as set forth in claim 1 further comprising generating repeatedly a plurality of signals including at least a second signal and said one signal to provide at least one pair of signals with said signals having the same duration and dividing said duration in the same proportion, changing the durations of said signals in said pair as they are repeated during said transmission to sweep the repetition frequencies thereof over an octave, displacing said signals in said pair in time with respect to each other by the same portion of said duration in each repetition of said pair during said transmission.

7. The invention as set forth in claim 6 wherein said proportion is 1 to 2 and said portion of said duration is 1/10 and spectral harmonics having harmonic numbers 3n, where n is an integer, and 5, are minimized.

8. The invention as set forth in claim 6 wherein said method further comprises the step of generating repeatedly at least another pair of said signals with the signals in said other pair being of said duration and dividing said duration in said proportion, changing the durations of said signals in said other pair as they are repeated during said transmission to sweep the repetition frequencies thereof over said octave, displacing the signals in said other pair in time with respect to each other by said same portion of said duration in each repetition during said transmission, and displacing said other pair of signals in time with respect to said one pair by a second portion of said duration which remains the same in each repetition.

9. The invention as set forth in claim 8 wherein said proportion is 1 to 2 and said first named portion is 1/10 and second portion is 1/14 and said spectral harmonics having harmonic numbers 3n, where n is an integer, 5 and 7 are minimized.

10. The invention as set forth in claim 1 wherein said method provides substantially constant spectral energy extending smoothly over said range, said method comprising generating repeatedly at least one other signal having the same waveform as said one signal and a duration which divides the duration of each repetition of said signal into parts of number $2^n$ where n is an integer, n being 1 for said one other signal, changing the duration of said other signal as it is repeated during said transmission also to sweep the repetition frequency of said other signal over an octave, displacing said other signal in time with respect to said one signal by a certain portion of said duration which remains the same in each said repetition such that the vector sum of the second harmonic amplitude of said one signal and the fundamental amplitude of said other signal, where n is 1, is approximately equal to the square root of 2 times the amplitude of the fundamental of said one signal.

11. The invention as set forth in claim 10 where said step of generating said other signal is carried out by generating a plurality of said other signals each of which divides said duration into $2^n$ parts where n is an integer different for each signal of said plurality of other signals, starting at 1 for said one other signal and increasing in direct relationship to the order of said other signals.

12. The invention as set forth in claim 10 including the step of generating repeatedly at least one additional signal of the same waveform as said one signal and the same duration as said one signal, changing the duration of said additional signal as it is repeated during said transmission to sweep the repetition frequency thereof over an octave, and displacing said additional signal in time with respect to said one signal by the same portion of said duration in each repetition during said transmission.

13. The invention as set forth in any of claims 6 to 12 including the step of producing a composite signal for transmission having a duration which is equal to the duration of said one signal and which corresponds to the sum of all said signals, said composite signal changing in duration as it repeats during said transmission.

14. A system for transmitting signals having a spectrum extending over a frequency range of more than an octave with spectral energy substantially constant over said range, said system comprising means for generating a plurality of pulse trains which are coherent with each other, means for shaping the pulses in each train such that the duration of each pulse is a predetermined portion of the repetition period thereof, which duration divides the period in proportion to the order of a spectral harmonic in said spectrum to be minimized, and means for sweeping the repetition frequency of at least a first of said pulse trains over a fundamental octave and at least a second of said pulse trains over an octave which is a second harmonic of said fundamental octave.

15. The invention as set forth in claim 14 wherein said generating means includes means for displacing the pulses of said second pulse train in time with respect to the pulses of said first train by a predetermined displacement which remains the same portion of the period of said first train as said trains sweep in frequency.

16. The invention as set forth in claim 15 wherein said generating means includes means for generating a first plurality of trains which includes said first train, said sweeping means includes means for sweeping each of said first plurality of trains over said fundamental octave, said displacing means includes means for also displacing the pulses of those of said first plurality of trains additional to said first train with respect to the pulses of said first train by predetermined displacements which remain the same portion of the period of said first train as said trains sweep in frequency.

17. The invention as set forth in claim 16 wherein said generating means provides said pulses with equal amplitude.

18. The invention as set forth in claim 14 further comprising seismic signal generating means responsive to said trains for transmitting seismic signals corresponding thereto into a medium.

19. The invention as set forth in claim 14 including means responsive to the said spectral harmonic to be minimized for adjusting the duration of said pulses.

20. Apparatus for transmitting signals having a spectrum extending over a frequency range of more than an octave with the energy due to certain spectral harmonics minimized, which comprises means for generating repeatedly at least one signal having a waveform with at least two levels which divide the duration of the signal in proportion to the order of the spectral harmonics which are to be minimized, and means for changing the duration of said signal as it is repeated during said transmission with the ratio of the duration of the longest to the shortest signal not exceeding a factor of 2 to 1 such that the repetition frequency of said signal sweeps over an octave.

21. The invention as set forth in claim 20 wherein said proportion is 1 to 2 and spectral harmonics have harmonic numbers 3n, where n is an integer, are minimized.

22. The invention as set forth in claim 20 where said signal consists of pulses.

23. The invention as set forth in claim 20 wherein said signals are seismic signals transmitted into a medium, said levels corresponding to forces applied to said medium, said generating means also provides a compressive force on said medium corresponding to the level of shorter duration and a tensile force on said medium corresponding to the level of longer duration.

24. The invention as set forth in claim 23 wherein said generating means provides a ratio of said shorter duration to said longer duration of 1:2 whereby spectral harmonics having harmonic number 3n, where n is an integer, are minimized.

25. The invention as set forth in claim 20 further comprising means for generating repeatedly a plurality of signals including at least a second signal and said one signal to provide at least one pair of signals with said signals having the same duration and dividing said duration in the same proportion, means for changing the durations of said signals in said pair as they are repeated during said transmission to sweep the repetition frequencies thereof over an octave, and means for displacing said signals in said pair in time with respect to each other by the same portion of said duration in each repetition of said pair during said transmission.

26. The invention as set forth in claim 25 wherein said proportion is 1 to 2 and said portion of said duration is 1/10 and spectral harmonics having harmonic numbers 3n, where n is an integer, and 5, are minimized.

27. The invention as set forth in claim 25 wherein said apparatus further comprises means for generating repeatedly at least another pair of said signals with the signals in said other pair being of said duration and dividing said duration in said proportion, means for changing the durations of said signals in said other pair as they are repeated during said transmission to sweep the repetition frequencies thereof over said octave, means for displacing the signals in said other pair in time with respect to each other by said same portion of said duration in each repetition during said transmission, and means for displacing said other pair of signals in time with respect to said one pair by a second portion of said duration which remains the same in each repetition.

28. The invention as set forth in claim 27 wherein said proportion is 1 to 2 and said first named portion is 1/10 and said second portion is 1/14 and said spectral harmonics having harmonic numbers 3n, where n is an integer, 5 and 7 are minimized.

29. The invention as set forth in claim 20 wherein said apparatus provides substantially constant spectral energy extending smoothly over said range, said apparatus further comprising means for generating repeatedly at least one other signal having the same waveform as said one signal and a duration which divides the duration of each repetition of said signal into parts of number $2^n$ where n in an integer, n being 1 for said one other signal, means for changing the duration of said other signal as it is repeated during said transmission also to sweep the repetition frequency of said other signal over an octave, means for displacing said other signal in time with respect to said one signal by a certain portion of said duration which remains the same in each said repetition such that the vector sum of the second harmonic amplitude of said one signal and the fundamental amplitude of said other signal, where n is 1, is approximately equal to the square root of 2 times the amplitude of the fundamental of said one signal.

30. The invention as set forth in claim 29 where said means for generating said other signal includes means for generating a plurality of said other signals each of which divides said duration into $2^n$ parts where n is an integer different for each signal of said plurality of other signals, starting at 1 for said one other signal and increasing in direct relationship to the order of said other signals.

31. The invention as set forth in claim 29 further comprising means for generating repeatedly at least one additional signal of the same waveform as said one signal and the same duration as said one signal, means for changing the duration of said additional signal as it is repeated during said transmission to sweep the repetition frequency thereof over an octave, and means for displacing said additional signal in time with respect to said one signal by the same portion of said duration in each repetition during said transmission.

32. The invention as set forth in any of claims 25 to 31 including means for producing a composite signal for transmission having a duration which is equal to the duration of said one signal and which corresponds to the sum of all said signals, said composite signal changing in duration as it repeats during said transmission.

* * * * *